US008855056B2

(12) United States Patent
Seo et al.

(10) Patent No.: US 8,855,056 B2
(45) Date of Patent: Oct. 7, 2014

(54) METHOD FOR PROCESSING DEGRADATION OF RADIO LINK QUALITY IN A WIRELESS COMMUNICATION SYSTEM SUPPORTING RELAYS

(75) Inventors: In Kwon Seo, Anyang-si (KR); Han Byul Seo, Anyang-si (KR); Hak Seong Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 77 days.

(21) Appl. No.: 13/582,527

(22) PCT Filed: Mar. 10, 2011

(86) PCT No.: PCT/KR2011/001672
§ 371 (c)(1),
(2), (4) Date: Sep. 4, 2012

(87) PCT Pub. No.: WO2011/112017
PCT Pub. Date: Sep. 15, 2011

(65) Prior Publication Data
US 2012/0327801 A1    Dec. 27, 2012

Related U.S. Application Data

(60) Provisional application No. 61/313,107, filed on Mar. 11, 2010.

(51) Int. Cl.
| | |
|---|---|
| H04W 4/00 | (2009.01) |
| H04B 7/155 | (2006.01) |
| H04B 1/74 | (2006.01) |
| H04J 13/00 | (2011.01) |
| H04W 24/00 | (2009.01) |
| H04W 28/04 | (2009.01) |
| H04W 84/04 | (2009.01) |

(52) U.S. Cl.
CPC ............... *H04B 1/74* (2013.01); *H04B 7/155* (2013.01); *H04J 13/0062* (2013.01); *H04W 24/00* (2013.01); *H04W 28/04* (2013.01); *H04W 84/047* (2013.01)
USPC ....................................................... 370/328

(58) Field of Classification Search
USPC ............... 370/315, 328–339, 350; 455/422.1, 455/426.1, 426.2, 436–444, 7, 9
See application file for complete search history.

(56) References Cited

U.S. PATENT DOCUMENTS

| | | | |
|---|---|---|---|
| 8,254,949 B2 * | 8/2012 | Tafreshi ........................ 455/453 |
| 2008/0107075 A1 | 5/2008 | Ramachandran et al. | |

(Continued)

OTHER PUBLICATIONS

David Soldani et al., "Wireless Relays for Broadband Access", Radio Communications Series, IEEE Communications Magazine, pp. 58-66, Mar. 2008.

*Primary Examiner* — Frank Duong
(74) *Attorney, Agent, or Firm* — Lee, Hong, Degerman, Kang & Waimey

(57) ABSTRACT

A method and apparatus for processing degradation of radio link quality in a wireless communication system supporting relays are disclosed. The method includes determining quality of a radio link between the first node and the communication apparatus, recovering the radio link between the first node and the communication apparatus, when the quality of the radio link between the first node and the communication apparatus is decreased to or below a predetermined threshold, and transmitting to the second node a signaling to control communication on a radio link between the second node and the communication apparatus, when the quality of the radio link between the first node and the communication apparatus is decreased to or below the predetermined threshold.

14 Claims, 15 Drawing Sheets

(56) References Cited

U.S. PATENT DOCUMENTS

| | | |
|---|---|---|
| 2009/0046573 A1 | 2/2009 | Damnjanovic |
| 2011/0039552 A1* | 2/2011 | Narasimha et al. ........... 455/425 |
| 2011/0194482 A1* | 8/2011 | Ji et al. .......................... 370/315 |
| 2011/0242970 A1* | 10/2011 | Prakash et al. ................ 370/225 |
| 2013/0182555 A1* | 7/2013 | Raaf et al. ..................... 370/216 |

* cited by examiner (a)

(b)

(a)

(b)

METHOD FOR PROCESSING DEGRADATION OF RADIO LINK QUALITY IN A WIRELESS COMMUNICATION SYSTEM SUPPORTING RELAYS

CROSS-REFERENCE TO RELATED APPLICATIONS

This application is the National Stage filing under 35 U.S.C. 371 of International Application No. PCT/KR2011/001672, filed on Mar. 10, 2011, which claims the benefit of U.S. Provisional Application Ser. No. 61/313,107, filed on Mar. 11, 2010, the contents of which are all incorporated by reference herein in their entirety.

TECHNICAL FIELD

The present invention relates to a wireless communication system, and more particularly, to a method and apparatus for processing the degradation of radio link quality in a wireless communication system supporting relays.

BACKGROUND ART

FIG. 1 illustrates a relay or Relay Node (RN) 120 and User Equipments (UEs) 131 and 132 within the coverage area of an evolved Node B (eNB or eNode B) 110 in a wireless communication system 100. The RN 120 may forward data received from the eNB 110 to the UE 132 within the coverage area of the RN 120 and may forward data received from the UE 132 to the eNB 110. This eNB 110 may be referred to as a donor-eNB. The RN 120 may extend a high-rate area, improve communication quality at a cell edge, and support a communication service inside a building or beyond the coverage area of the eNB 110. In FIG. 1, a UE that receives a service directly from an eNB (hereinafter, referred to a Macro-UE or M-UE) such as the UE 131 coexists with a UE that receives a service from an eNB via an RN (hereinafter, referred to a Relay-UE or R-UE) such as the UE 132.

A radio link established between an eNB and an RN may be called a backhaul link. Specifically, a link from the eNB to the RN and a link from the RN to the eNB may be called a backhaul downlink and a backhaul uplink, respectively. A radio link established between an RN and a UE may be called an access link. Specifically, a link from the RN to the UE and a link from the UE to the RN may be called an access downlink and an access uplink, respectively.

Meanwhile, the quality of a radio link between an eNB and a UE may be degraded due to various factors. When the UE fails to receive a control signal from the eNB or the quality of a received signal is significantly degraded, this may be defined as a Radio Link Failure (RLF). To handle the RLF, the UE first identifies a problem at a physical layer and attempts to solve the physical layer problem. If the UE fails to recover from the physical layer problem, the UE may transmit a connection re-establishment request to the eNB, determining that an RLF has been detected.

DISCLOSURE

Technical Problem

An RN plays a role in forwarding information and data between an eNB and a UE. Therefore, when the quality of a backhaul link is degraded in spite of a good access link quality, the RN may not transmit information and data between the eNB and the UE.

A conventional radio link recovery scheme defines detection of an RLF between an eNB and a UE. If the access link between a UE and an RN has good quality despite degraded quality of a backhaul link, no action may be taken against the situation in which information and data cannot be received.

An object of the present invention devised to solve the problem lies on a signaling method and apparatus for controlling signal transmission and reception on a radio link between a relay or a Relay Node (RN) and a User Equipment (UE), taking into account the quality of a radio link between the RN and a Base Station (BS).

Another object of the present invention devised to solve the problem lies on a new signaling method and apparatus for enabling reliable signal transmission and reception on a radio link between an RN and a UE, when the quality of a radio link between the RN and a BS is degraded.

It will be appreciated by persons skilled in the art that the objects that can be achieved with the present invention are not limited to what has been particularly described hereinabove and the above and other objects that the present invention can achieve will be more clearly understood from the following detailed description taken in conjunction with the accompanying drawings.

Technical Solution

The object of the present invention can be achieved by providing a method for processing degradation of radio link quality in a communication apparatus connected wirelessly to a first node and a second node, comprising, determining quality of a radio link between the first node and the communication apparatus, recovering the radio link between the first node and the communication apparatus, when the quality of the radio link between the first node and the communication apparatus is decreased to or below a predetermined threshold, and transmitting to the second node a signaling to control communication on a radio link between the second node and the communication apparatus, when the quality of the radio link between the first node and the communication apparatus is decreased to or below the predetermined threshold.

In another aspect of the present invention, provided herein is a communication apparatus for processing degradation of radio link quality, comprising a first reception module for receiving a downlink signal from a first node, a first transmission module for transmitting an uplink signal to the first node, a second reception module for receiving an uplink signal from a second node, a second transmission module for transmitting a downlink signal to the second node, and a processor for controlling the communication apparatus including the first and second reception modules and the first and second transmission modules, wherein the processor is configured to determine quality of a radio link between the first node and the communication apparatus, to recover the radio link between the first node and the communication apparatus, when the quality of the radio link between the first node and the communication apparatus is decreased to or below a predetermined threshold, and to transmit to the second node through the second transmission module a signaling to control communication on a radio link between the second node and the communication apparatus, when the quality of the radio link between the first node and the communication apparatus is decreased to or below the predetermined threshold.

In each aspect of the present invention, when the quality of the radio link between the first node and the communication apparatus is decreased to or below the predetermined threshold, a Radio Link Failure (RLF) of the radio link between the first node and the communication apparatus may be detected.

In each aspect of the present invention, the signaling to control communication on a radio link between the second node and the communication apparatus may be one of a wait message for transmission and reception to and from the second node, a message configuring Discontinuous Transmission/Discontinuous Reception (DTX/DRX) for the second node, and a message commanding the second node to transmit a connection re-establishment request message to a target cell.

In each aspect of the present invention, the signaling to control communication on a radio link between the second node and the communication apparatus may be one of a cell-specific control signaling, a User Equipment (UE)-specific control signaling, and a broadcast message.

In each aspect of the present invention, the recovery of the radio link between the first node and the communication apparatus may comprise performing handover to a target cell or performing a connection re-establishment procedure.

In each aspect of the present invention, a release message may be transmitted to the second node, when the radio link between the first node and the communication apparatus is not recovered in a predetermined time period.

In each aspect of the present invention, the release message may be one of a cell-specific control signaling, a UE-specific control signaling, and a broadcast message.

In each aspect of the present invention, the communication apparatus is a relay, the first node is a Base Station (BS), and the second node is a UE.

It is to be understood that both the foregoing general description and the following detailed description of the present invention are exemplary and explanatory and are intended to provide further explanation of the invention as claimed.

Advantageous Effects

According to the present invention, a signaling method and apparatus for controlling signal transmission and reception on a radio link between an RN and a UE, taking into account the quality of a radio link between the RN and an eNB can be provided. Further, a new signaling method and apparatus for enabling reliable signal transmission and reception on a radio link between an RN and a UE, when the quality of a radio link between the RN and an eNB is degraded can be provided.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
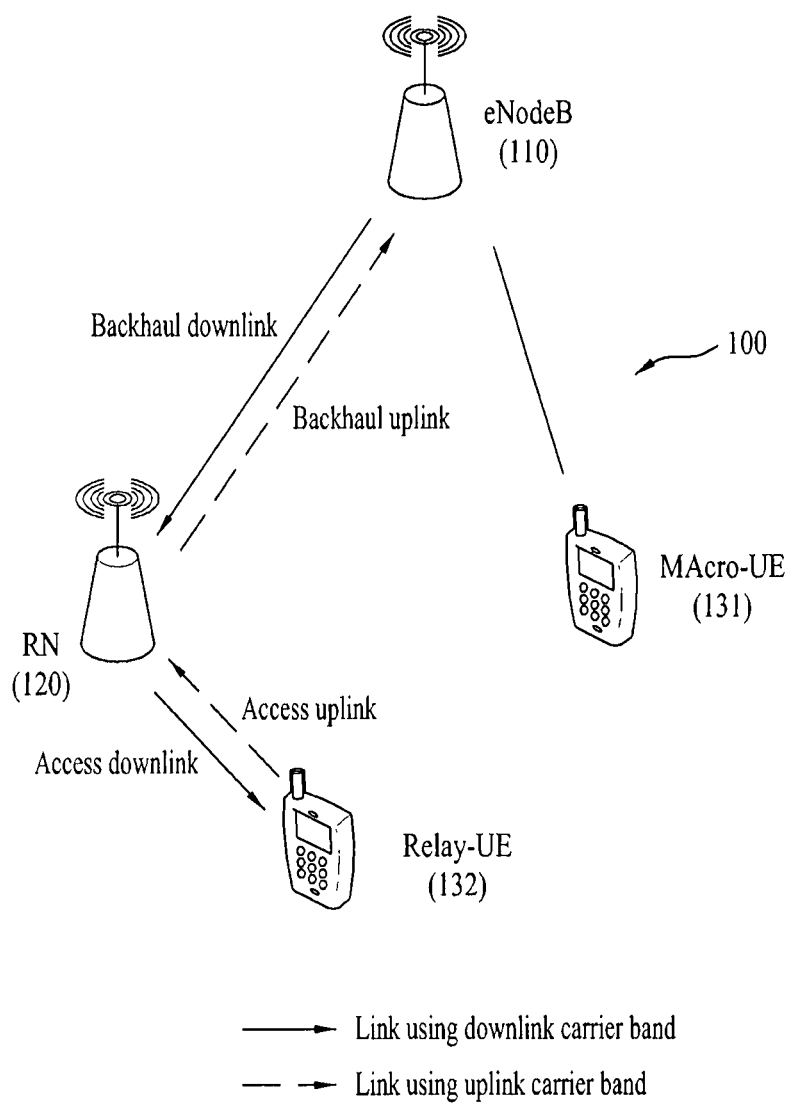
FIG. 1 illustrates a wireless communication system including an evolved Node B (eNB or eNode B), a relay or Relay Node (RN), and User Equipments (UEs).

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship among a Base Station (BS) and a User Equipment (UE). The BS is an end node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term "relay" may be used interchangeably with 'Relay Node (RN)', 'Relay Station (RS)', etc. The term 'UE' may be replaced with the term 'terminal', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved-UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto.

Figure 2:
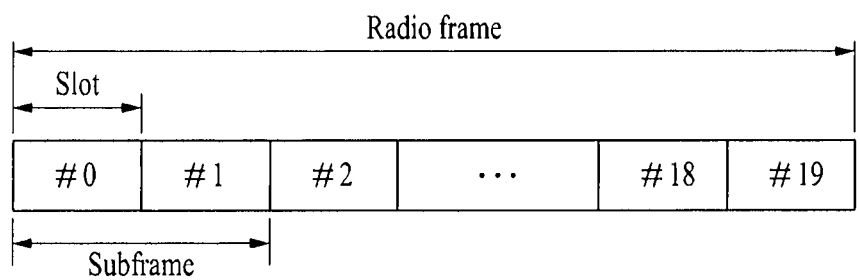
FIG. 2 illustrates the structure of a radio frame in a $3^{rd}$ Generation Partnership Project Long Term Evolution (3GPP LTE) system.

FIG. 2 illustrates a radio frame structure in the 3GPP LTE system.

Referring to FIG. 2, a radio frame is divided into 10 subframes. Each subframe is further divided into two slots in the time domain. A unit time in which one subframe is transmitted is defined as Transmission Time Interval (TTI). For example, one subframe may be 1 ms in duration and one slot may be 0.5 ms in duration. A slot may include a plurality of Orthogonal Frequency Division Multiplexing (OFDM) symbols in the time domain. Because the 3GPP LTE system adopts OFDMA for downlink, an OFDM symbol represents one symbol interval. A symbol may be referred to as an SC-FDMA symbol or symbol interval on the uplink. A Resource Block (RB) is a resource allocation unit including a plurality of consecutive subcarriers in a slot. This radio frame structure is purely exemplary and thus the number of subframes in a radio frame, the number of slots in a subframe, or the number of OFDM symbols in a slot may vary.

Figure 3:
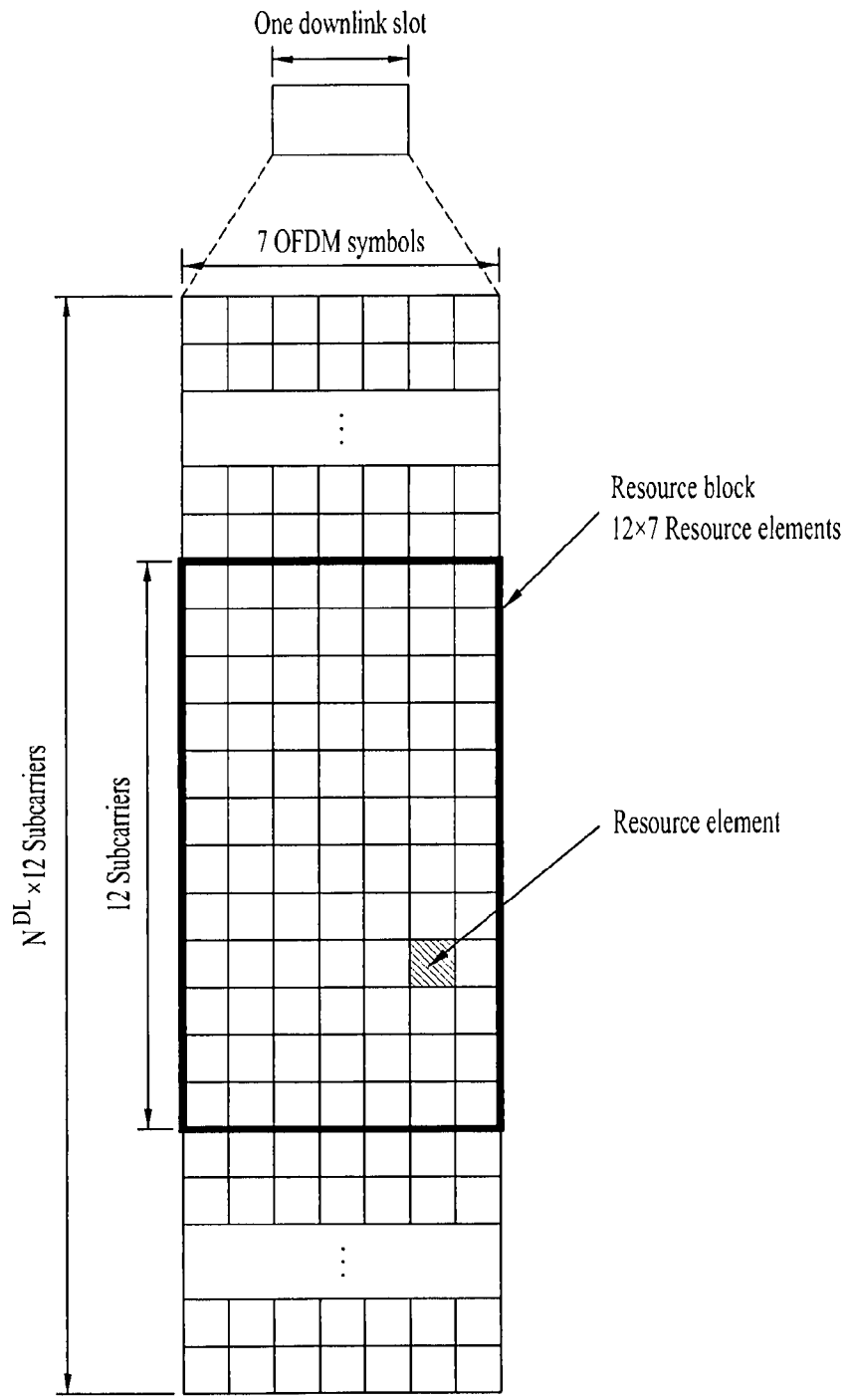
FIG. 3 illustrates the structure of a downlink resource grid for the duration of one downlink slot.

FIG. 3 illustrates the structure of a downlink resource grid for the duration of one downlink slot.

Referring to FIG. 3, a downlink slot has 7 OFDM symbols in the time domain and an RB includes 12 subcarriers in the frequency domain, which does not limit the scope and spirit of the present invention. For example, a downlink slot includes 7 OFDM symbols in a subframe with a normal Cyclic Prefix (CP), whereas a downlink slot includes 6 OFDM symbols in a subframe with an extended CP. Each element of the resource grid is referred to as a Resource Element (RE). An RB includes 12×7 REs. The number of RBs in a downlink slot, $N^{DL}$ depends on a downlink transmission bandwidth. An uplink slot may have the same structure as a downlink slot.

Figure 4:
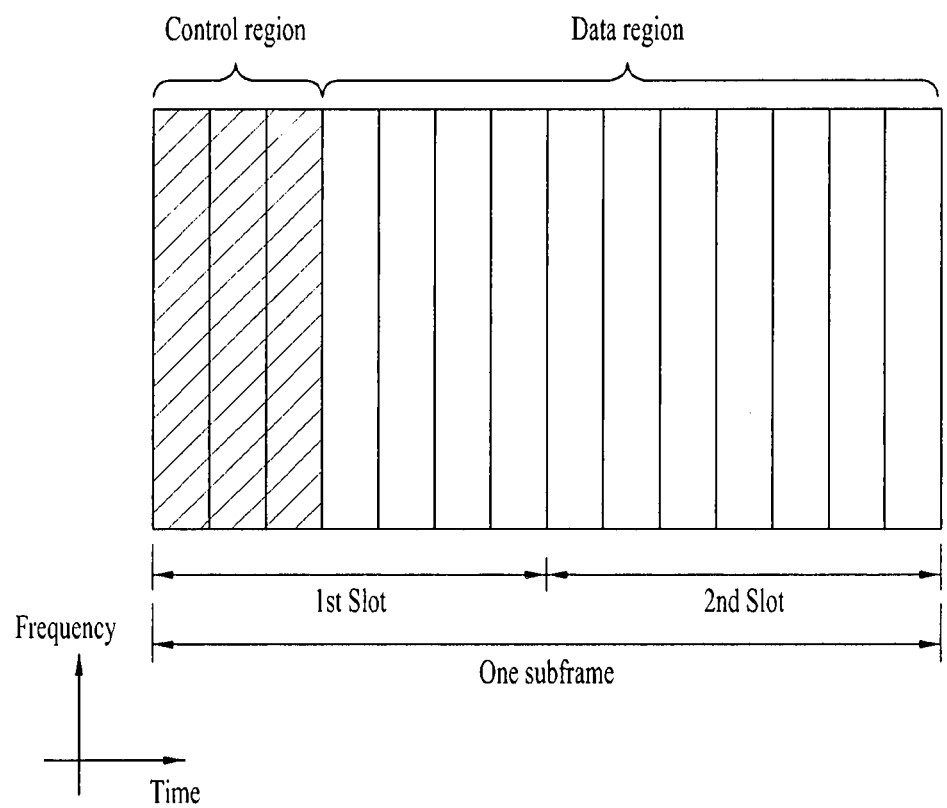
FIG. 4 illustrates the structure of a downlink subframe.

FIG. 4 illustrates a downlink subframe structure.

Referring to FIG. 4, up to three OFDM symbols at the start of the first slot in a downlink subframe are used for a control region to which control channels are allocated and the other OFDM symbols of the downlink subframe are used for a data region to which a Physical Downlink Shared CHannel (PDSCH) is allocated. Downlink control channels used in the 3GPP LTE system include a Physical Control Format Indicator CHannel (PCFICH), a Physical Downlink Control CHannel (PDCCH), and a Physical Hybrid automatic repeat request (ARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal as a response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a random access response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE includes a set of REs. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a random access response to a random access preamble transmitted by a UE, its CRC may be masked by a Random Access-RNTI (RA-RNTI).

Figure 5:
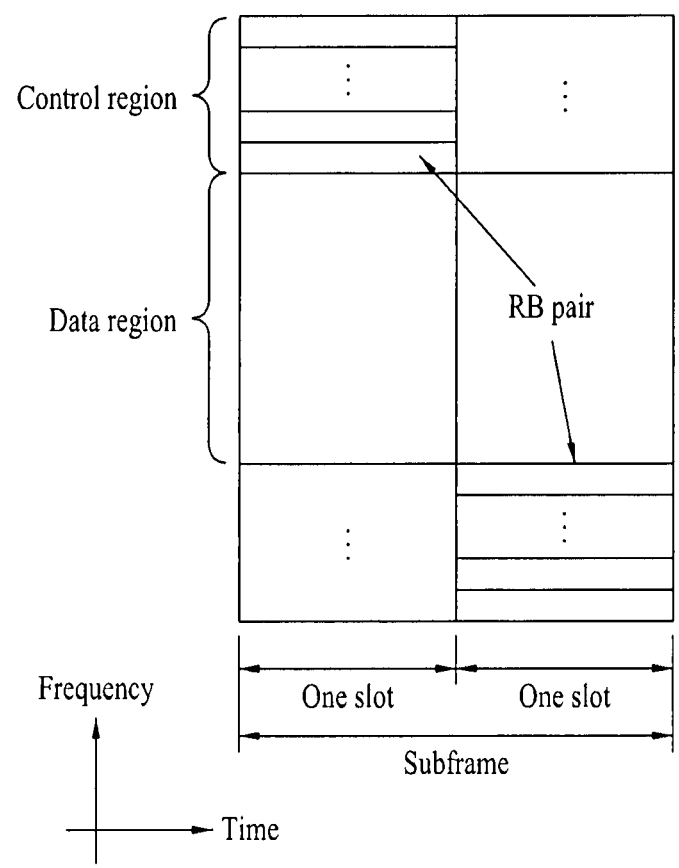
FIG. 5 illustrates the structure of an uplink subframe.

FIG. 5 illustrates an uplink subframe structure.

Referring to FIG. 5, an uplink subframe may be divided into a control region and a data region in the frequency domain. A Physical Uplink Control CHannel (PUCCH) carrying uplink control information is allocated to the control region and a Physical Uplink Shared CHannel (PUSCH) carrying user data is allocated to the data region. To maintain single-carrier characteristics, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Modeling of Multiple Input Multiple Output (MIMO) System

Figure 6:
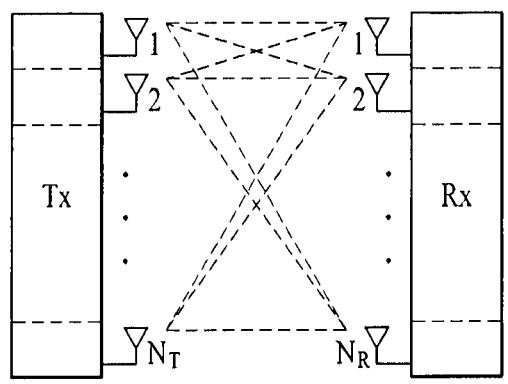
FIG. 6 illustrates the configuration of a Multiple Input Multiple Output (MIMO) wireless communication system.
Figure 6:
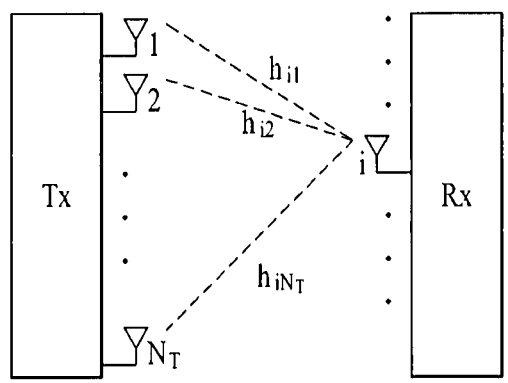

FIG. 6 illustrates the configuration of a MIMO wireless communication system.

Referring to FIG. 6(a), when the number of Transmission (Tx) antennas and the number of Reception (Rx) antennas are increased to $N_T$ and $N_R$, respectively at both a transmitter and a receiver, a theoretical channel transmission capacity increases in proportion to the number of antennas, compared to use of a plurality of antennas at only one of the transmitter and the receiver. Therefore, transmission rate and frequency efficiency are remarkably increased. Along with the increase of channel transmission capacity, the transmission rate may be increased in theory to the product of a maximum transmission rate $R_o$ that may be achieved in case of a single antenna and a rate increase rate $R_i$.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna wireless communication system. Since the theoretical capacity increase of the MIMO wireless communication system was proved in the mid 1990's, many techniques have been actively studied to increase data rate in real implementation. Some of the techniques have already been reflected in various wireless communication standards including standards for 3G mobile communications, future-generation Wireless Local Area Network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with $N_T$ Tx antennas and $N_R$ Rx antennas will be described in detail through mathematical modeling.

Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmit power levels of the transmission information be denoted by $P_1, P_2, \ldots, P_{N_T}$, respectively. Then the transmission power-controlled transmission information vector may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector x, which may be determined as $$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Here, $w_{ij}$ denotes a weight between a $j^{th}$ piece of information and an $i^{th}$ Tx antenna.

Given $N_R$ Rx antennas, signals received at the Rx antennas, $y_1, y_2, \ldots, y_{N_R}$ may be represented as the following vector.

$$y = [y_1, y_2, \ldots, y_{N_R}]^T \quad \text{[Equation 6]}$$

When channels are modeled in the MIMO wireless communication system, they may be distinguished according to the indexes of Tx and Rx antennas. A channel between a $j^{th}$ Tx antenna and an $i^{th}$ Rx antenna is denoted by $h_{ij}$. Notably, the index of an Rx antenna precedes the index of a Tx antenna in $h_{ij}$.

FIG. 6(b) illustrates channels from $N_T$ Tx antennas to an $i^{th}$ Rx antenna. The channels may be collectively represented as a vector or a matrix.

Referring to FIG. 6(b), the channels from the $N_T$ Tx antennas to the $i^{th}$ Rx antenna may be expressed as [Equation 7].

$$h_i^T = [h_{i1}, h_{i2}, \ldots, h_{iN_T}] \quad \text{[Equation 7]}$$

Hence, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 8]}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \quad \text{[Equation 9]}$$

From the above mathematical modeling, the received signal vector is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = $$ [Equation 10]

$$Hx + n$$

The numbers of rows and columns in the channel matrix H representing channel states are determined according to the numbers of Rx and Tx antennas. Specifically, the number of rows in the channel matrix H is equal to the number of Rx antennas, $N_R$ and the number of columns in the channel matrix H is equal to the number of Tx antennas, $N_T$. Hence, the channel matrix H is of size $N_R \times N_T$.

The rank of a matrix is defined as the smaller between the number of independent rows and the number of independent columns in the matrix. Accordingly, the rank of the matrix is not larger than the number of rows or columns of the matrix. The rank of the channel matrix H, rank(H) satisfies the following constraint.

$$\text{rank}(H) \leq \min(N_T, N_R)$$ [Equation 11]

The rank of a matrix may also be defined as the number of non-zero eigenvalues, when the matrix is decomposed by EigenValue Decomposition (EVD). Similarly, the rank of a matrix may be defined as the number of non-zero singular values, when the matrix is decomposed by Singular Value Decomposition (SVD). Therefore, the rank of a channel matrix may be the maximum number of different pieces of information that can be transmitted on a physical channel, in its physical meaning.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In case of data transmission and reception through multiple antennas, knowledge of channel states between Tx antennas and Rx antennas is required for successful signal reception. Accordingly, an RS should exist for each Tx antenna.

Downlink RSs are categorized into Common RS (CRS) shared among all UEs and Dedicated RS (DRS) specific to a particular UE. These RSs may deliver information for channel estimation and demodulation.

A receiver (i.e. a UE) may feed back a channel quality-related indicator such as a Channel Quality Indicator (CQI), a Precoding Matrix Indicator (PMI), and/or a Rank Indicator (RI) by estimating channel states using CRSs. A CRS is also called a cell-specific RS. An RS related to feedback of Channel State Information (CSI) such as a CQI/PMI/RI may be separately defined as a CSI-RS.

A DRS may be transmitted on a predetermined RE, when data transmitted on a PDSCH needs to be demodulated. A higher layer may notify a UE whether a DRS exists and also notify the UE that only when a related PDSCH is mapped, the DRS is valid. A DRS is also called a UE-specific RS or Demodulation Reference Signal (DMRS).

Figure 7:
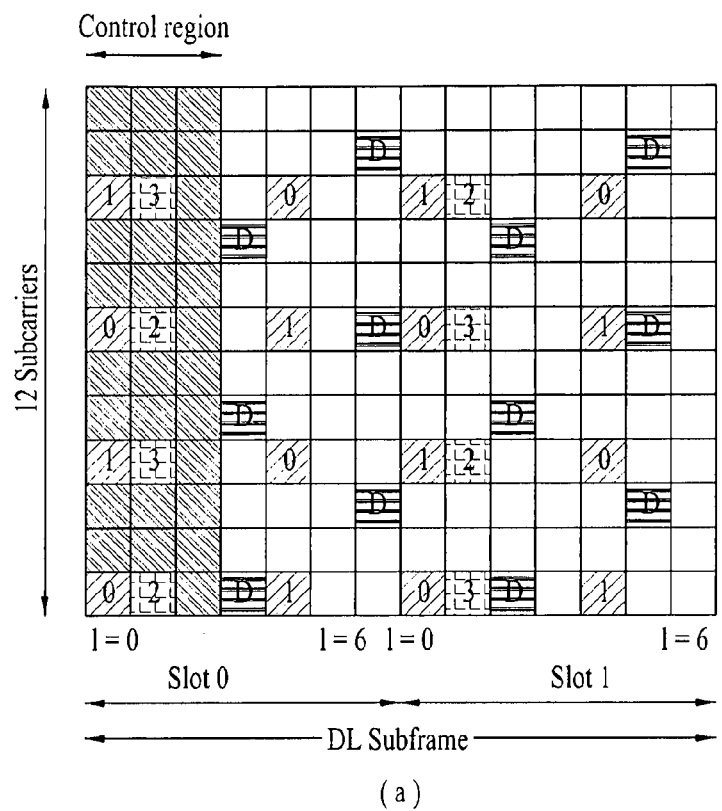
FIG. 7 illustrates downlink Reference Signal (RS) patterns defined for the 3GPP LTE system.
Figure 7:
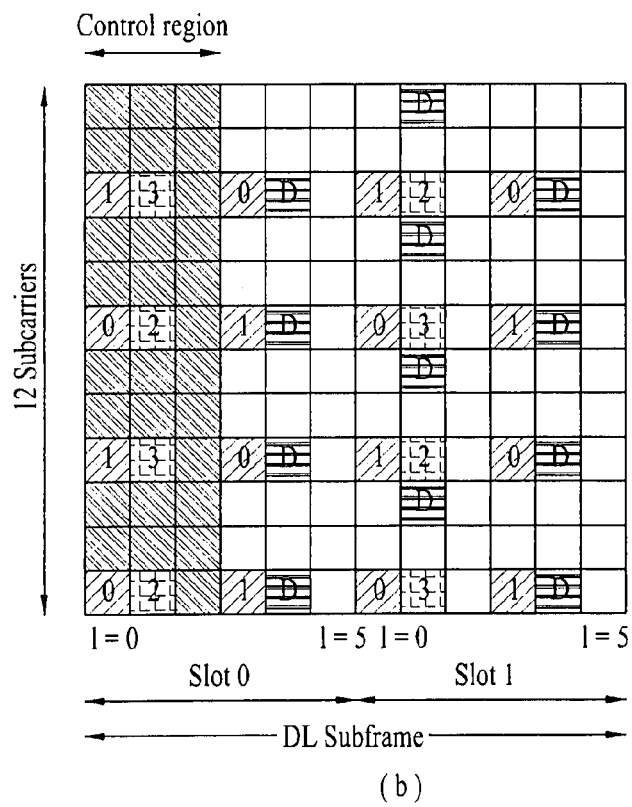

FIG. 7 illustrates patterns in which CRSs and DRSs are mapped to a downlink RB, as defined in a conventional 3GPP LTE system (e.g. conforming to Release-8). An RS mapping unit, i.e. a downlink RB may include one subframe in time by 12 subcarriers in frequency. That is, an RB includes 14 OFDM symbols in time in case of a normal CP (see FIG. 7(a)) and 12 OFDM symbols in time in case of an extended CP (see FIG. 7(b)).

In FIG. 7, the positions of RSs in an RB for a system where an eNB supports four Tx antennas are illustrated. Reference numerals 0, 1, 2 and 3 denote the positions of CRSs for first to fourth antenna ports, antenna port 0 to antenna port 3, respectively, and reference character D denotes the positions of DRSs.

CRSs will first be described below in detail.

CRSs are used for estimating channels of physical antenna ends. The CRSs are common to all UEs within a cell, distributed across a total frequency band. The CRSs may also serve the purpose of CSI acquisition and data demodulation.

CRSs are configured in various manners depending on the configuration of antennas at a transmitter (i.e. an eNB). The 3GPP LTE system (e.g. conforming to Release-8) supports a variety of antenna configurations and downlink transmitters (i.e. eNBs) have three antenna configurations, 1-Tx, 2-Tx and 4-Tx. In 1-Tx transmission, an eNB allocates an RS for a single antenna port. In 2-Tx transmission, the eNB allocates RSs for two antenna ports in Time Division Multiplexing (TDM) and/or Frequency Division Multiplexing (FDM). That is, RSs for two antenna ports are allocated to different time resources and/or different frequency resources and thus distinguished from each other by time and/or frequency. In 4-Tx transmission, the eNB allocates RSs for four antenna ports in TDM/FDM. Channel information that a downlink receiver (i.e. a UE) estimates from CRSs may be used for demodulation of data transmitted in a transmission scheme such as single antenna transmission, transmit diversity, closed-loop spatial multiplexing, open-loop spatial multiplexing, Multi-User MIMO (MU-MIMO), etc.

When multiple antennas are supported, an antenna port transmits an RS on predetermined REs according to an RS pattern, while transmitting no signal on REs designated for the other antenna ports.

CRSs are mapped to an RB according to the following rule described as [Equation 12].

$$k = 6m + (v + v_{shift}) \bmod 6$$ [Equation 12]

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

where k denotes a subcarrier index, l denotes a symbol index, p denotes an antenna port index, $N_{symb}^{DL}$ denotes the number of OFDM symbols in a downlink slot, $N_{RB}^{DL}$ denotes the number of allocated downlink RBs, $n_s$ denotes a slot index, $N_{ID}^{cell}$ denotes a cell ID, and mod represents a modulo operation. The positions of RSs in the frequency domain depend on the value of $V_{shift}$ and $V_{shift}$ in turn depends on the cell ID. Therefore, the positions of RSs have different frequency shift values in different cells.

To increase channel estimation performance using CRSs, the positions of CRSs of each cell may be shifted along the frequency axis by a frequency shift value specific to the cell, so that different cells have CRSs at different positions. For example, when an RS is positioned on every three subcarriers, one cell may allocate an RS to subcarrier $3k$, whereas another cell may allocate an RS to subcarrier ($3k+1$). For one antenna port, an RS is allocated to every 6 REs (i.e. a 6-subcarrier spacing) in the frequency domain, apart from an RE to which an RS is allocated for another antenna port by three REs.

Power boosting may be applied to CRSs. Power boosting refers to transmission of an RS with higher power than originally allocated to an RE for the RS by lowering the power of a non-RS RE.

In the time domain, RSs are positioned at every predetermined interval in the time domain, stating from symbol 0 (l=0) in each slot. The interval varies with a CP length. RSs are positioned in symbols 0 and 4 in a slot of a subframe with a normal CP, and RSs are positioned in symbols 0 and 3 in a slot of a subframe with an extended CP. For one OFDM symbol, only RSs for up to two antenna ports are defined. Therefore, in 4-Tx transmission, RSs for antenna port 0 and antenna port 1 are positioned in symbol 0 and symbol 4 (in symbol 0 and symbol 3 in a subframe with an extended CP) and RSs for antenna port 2 and antenna port 3 are positioned in symbol 1 in a slot. One thing to note herein is that the frequency positions of the RSs for antenna port 2 and antenna port 3 are exchanged in a second slot.

To support higher spectral efficiency than the conventional 3GPP LTE system (e.g. conforming to Release-8), a system having an extended antenna configuration (e.g. an LTE-A system) may be designed. The extended antenna configuration may be, for example, an 8-Tx antenna configuration. This system having the extended antenna configuration needs to support UEs operating in the conventional antenna configurations, that is, to ensure backward compatibility. Therefore, it is necessary to design a new RS pattern for an additional antenna configuration, while supporting RS patterns for the conventional antenna configurations. If CRSs are added for new antenna ports in the system having the conventional antenna configurations, RS overhead rapidly increases, thereby decreasing data rate. An evolution of 3GPP LTE, the LTE-A system may introduce separate RSs called CSI-RSs for measuring the channel state information of new antenna ports.

Now a detailed description will be given of DRSs.

A DRS (or a UE-specific RS) is used for data demodulation. For transmission through multiple antennas, precoding weights for a particular UE are still applied to RSs such that when the UE receives the RSs, it may estimate equivalent channels in which the precoding weights applied to the respective Tx antennas are combined with transmission channels.

The conventional 3GPP LTE system (e.g. conforming to Release-8) supports transmission through up to four Tx antennas and defines a DRS for rank-1 beamforming. The DRS for rank-1 beamforming is represented as an RS for antenna port 5. The DRS is mapped to an RB according to [Equation 13] in case of a normal CP and according to [Equation 14] in case of an extended CP.

$$k = (k')\bmod N_{sc}^{RB} + N_{sc}^{RB} \cdot n_{PRB} \quad \text{[Equation 13]}$$

$$k' = \begin{cases} 4m' + v_{shift} & \text{if } l \in \{2, 3\} \\ 4m' + (2 + v_{shift})\bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k')\bmod N_{sc}^{RB} + N_{sc}^{RB} \cdot n_{PRB} \quad \text{[Equation 14]}$$

$$k' = \begin{cases} 3m' + v_{shift} & \text{if } l = 4 \\ 3m' + (2 + v_{shift})\bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

where k is a subcarrier index, l is a symbol index, p is the index of an antenna port, $N_{SC}^{RB}$ is the frequency-domain size of an RB expressed as the number of subcarriers, $n_{PRB}$ is the number of a PRB, $R_{RB}^{PDSCH}$ is the bandwidth of an RB used for transmitting a PDSCH, $n_s$ is the index of a slot, $N_{ID}^{cell}$ is a cell ID, and mod represents a modulo operation. The position of an RS in the frequency domain depends on the value of $V_{shift}$ and $V_{shift}$ in turn depends on the cell ID. Therefore, the positions of RSs have different frequency shift values in different cells.

High-order MIMO, multi-cellular transmission, and advanced MU-MIMO are under consideration for the LTE-A system. Especially, DRS-based data demodulation is considered in order to support efficient use of RSs and an advanced transmission scheme. Compared to the conventional 3GPP LTE system such as one conforming to Release-8 which defines a DRS for rank-1 beamforming (through antenna port 5), the LTE-A system may define DRSs for two or more layers to support data transmission through additional antennas.

Cooperative Multi-Point (CoMP)

To satisfy enhanced system performance requirements for the 3GPP LTE-A system, CoMP transmission and reception technology known as co-MIMO, collaborative MIMO or network MIMO has been proposed. The CoMP technology can increase the performance of UEs located at a cell edge and average sector throughput.

It is known that Inter-Cell Interference (ICI) generally degrades the performance of a UE at a cell edge and average sector throughput in a multi-cellular environment with a frequency reuse factor of 1. To offer an appropriate throughput performance to a cell-edge UE in an environment constrained by interference, a simple ICI mitigation technique such as UE-specific power control-based Fractional Frequency Reuse (FFR) is used in the conventional LTE system. However, it may be preferred to reduce the ICI or reuse the ICI as a desired signal for the UE, rather than to decrease the utilization of frequency resources per cell. For this purpose, CoMP transmission techniques may be adopted.

Downlink CoMP schemes are classified largely into Joint Processing (JP), and Coordinated Scheduling/Beamforming (CS/CB).

According to the JP scheme, each point (eNB) of a CoMP cooperation unit may use data. The CoMP cooperation unit refers to a set of eNBs used for a CoMP transmission operation. The JP scheme is further branched into joint transmission and dynamic cell selection.

Joint transmission is a technique of transmitting PDSCHs from a plurality of points (a part or the whole of a CoMP cooperation unit) at one time. That is, a plurality of transmission points may simultaneously transmit data to a single UE. The joint transmission scheme can improve the quality of a received signal coherently or non-coherently and actively eliminate interference to other UEs, as well.

Dynamic cell selection is a technique of transmitting a PDSCH from one point of a CoMP cooperation unit at one time. That is, one point of the CoMP cooperation unit transmits data to a single UE at a given time point, while the other points of the CoMP cooperation unit do not transmit data to the UE at the time point. A point to transmit data to a UE may be dynamically selected.

Meanwhile, in the CS/CB scheme, a CoMP cooperation unit may perform cooperative beamforming for data transmission to a single UE. While only a serving cell transmits data to the UE, user scheduling/beamforming may be determined through coordination among cells of the CoMP cooperation unit.

Uplink CoMP reception refers to uplink reception of a transmitted signal through coordination at a plurality of geographically separated points. Uplink CoMP schemes include Joint Reception (JR) and Coordinated Scheduling/Beamforming (CS/CB).

In JR, a plurality of reception points receive a signal transmitted on a PUSCH. CS/CB is a technique in which while only one point receives a PUSCH, user scheduling/beamforming is determined through coordination among cells of a CoMP cooperation unit.

Sounding Reference Signal (SRS)

An SRS is used for an eNB to measure channel quality and perform uplink frequency-selective scheduling based on the channel quality measurement. The SRS is not associated with data and/or control information transmission. However, the usages of the SRS are not limited thereto. The SRS may also be used for enhanced power control or for supporting various start-up functions of non-scheduled UEs. The start-up functions may include, for example, an initial Modulation and Coding Scheme (MCS), initial power control for data transmission, timing advance, and frequency non-selective scheduling. Frequency non-selective scheduling refers to a type of scheduling in which a transmitter selectively allocates a frequency resource to the first slot of a subframe and then pseudo-randomly hops to another frequency resource in the second slot of the subframe.

The SRS may be used for measuring downlink channel quality on the assumption of the reciprocity of a radio channel between the downlink and the uplink. This assumption is valid especially in a Time Division Duplex (TDD) system in which the downlink and the uplink share the same frequency band and are distinguished by time.

A subframe in which a UE within a cell is supposed to transmit an SRS is indicated by cell-specific broadcast signaling. A 4-bit cell-specific parameter 'srsSubframeConfiguration' indicates 15 possible configurations for subframes carrying SRSs. These configurations may provide flexibility with which SRS overhead can be adjusted according to network deployment scenarios. The other one configuration (a $16^{th}$ configuration) represented by the parameter is perfect switch-off of SRS transmission in a cell, suitable for a cell serving high-speed UEs, for example.

Figure 8:
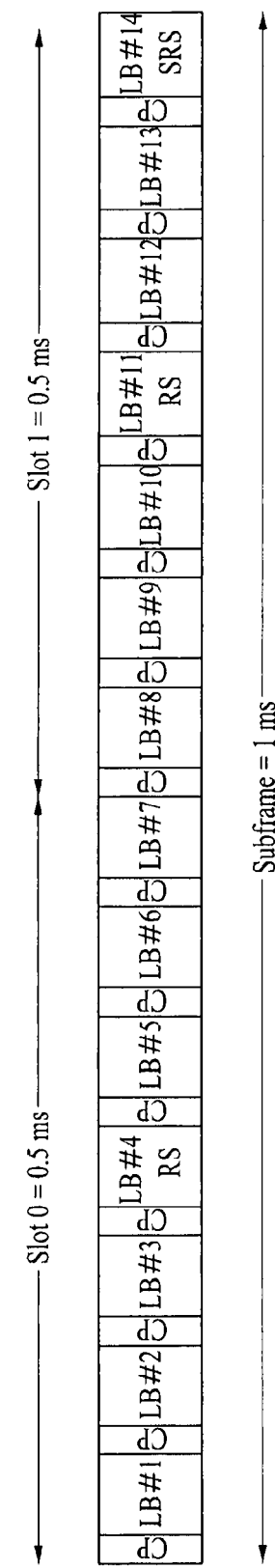
FIG. 8 is a view referred to for describing RS transmission in an uplink subframe.

Referring to FIG. 8, an SRS is always transmitted in the last SC-FDMA symbol of a configured subframe. Therefore, an SRS and a DMRS are positioned in different SC-FDMA symbols. PUSCH data transmission is not allowed in an SC-FDMA symbol designated for SRS transmission. Accordingly, even the highest sounding overhead (in the case where SRS symbols exist in all subframes) does not exceed 7%.

Each SRS symbol is generated for a given time unit and frequency band, using a base sequence (a random sequence or Zadoff-Chu (ZC)-based sequence set), and all UEs within a cell use the same base sequence. SRS transmissions in the same time unit and the same frequency band from a plurality of UEs within a cell are distinguished orthogonally by different cyclic shifts of the base sequence allocated to the plurality of UEs. Although the SRS sequences of different cells may be distinguished by allocating different base sequences to the cells, orthogonality is not ensured between the different base sequences.

Relay

Use of RNs may be considered, for example, for the purpose of improving the coverage of high data rates, group mobility, temporary network deployment, cell-edge throughput, and/or providing network coverage in new areas. The RN may be fixed or mobile.

Referring to FIG. 1 again, the RN 120 forwards data between the eNB 110 and the UE 131. Two types of links having different characteristics in respective carrier frequency bands, that is, a backhaul link and an access link are established for the RN 120. The eNB 110 may cover a donor cell. The RN 120 is connected wirelessly to a wireless access network through the donor cell 110.

If the backhaul link between the eNB 110 and the RN 120 uses a downlink frequency band or downlink subframe resources, it is called a backhaul downlink. If the backhaul link uses an uplink frequency band or uplink subframe resources, it is called a backhaul uplink. The frequency bands are FDD resources and the subframes are TDD resources. Likewise, if the access link between the RN 120 and the UE(s) 131 uses a downlink frequency band or downlink subframe resources, it is called an access downlink. If the access link uses an uplink frequency band or uplink subframe resources, it is called an access uplink. FIG. 1 illustrates establishment of a backhaul uplink/downlink and an access uplink/downlink for an FDD RN.

The functions of uplink reception and downlink reception are required for an eNB and the functions of uplink transmission and downlink reception are required for a UE. For an RN, the functions of backhaul uplink transmission to an eNB, access uplink reception from a UE, backhaul downlink reception from the eNB, and access downlink transmission to the UE are required.

Figure 9:
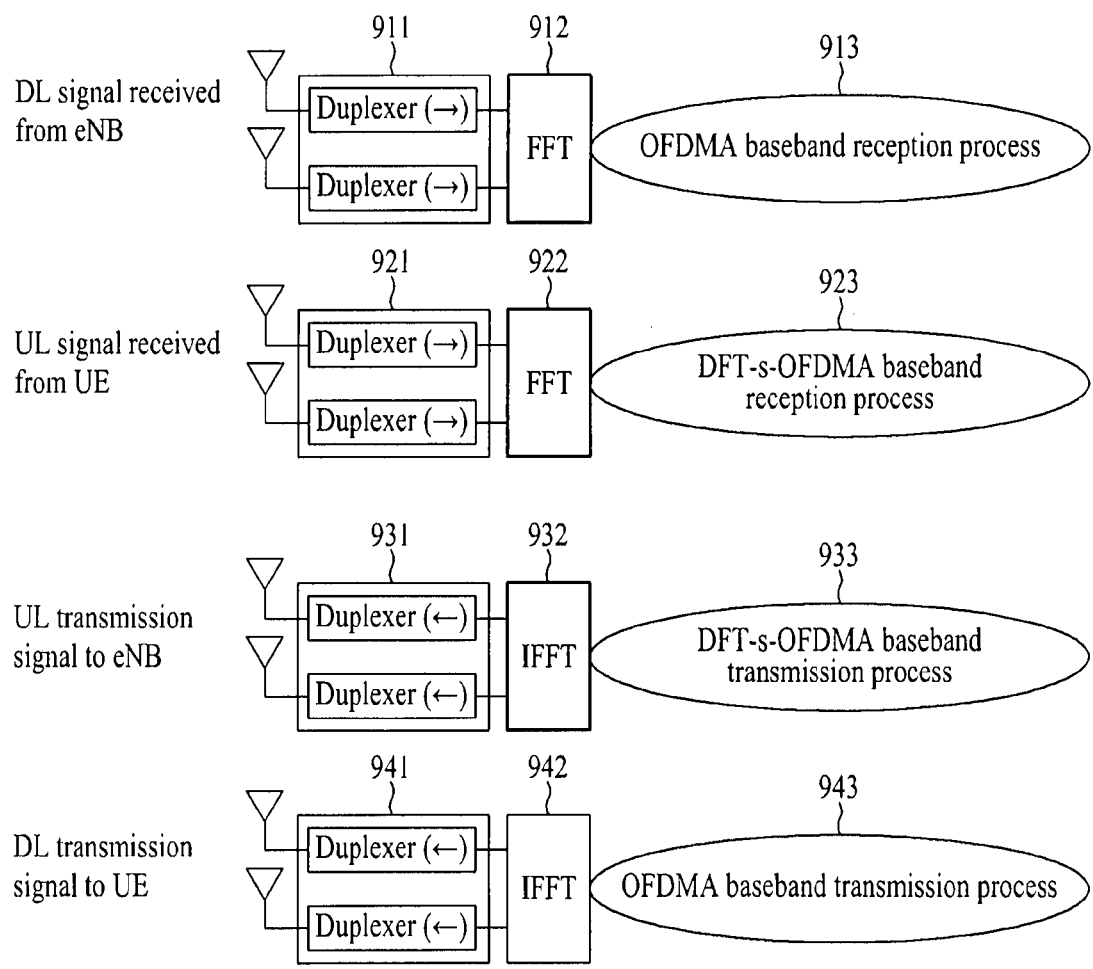
FIG. 9 illustrates exemplary implementation of transmission and reception functions of a Frequency Division Duplex (FDD) RN.

FIG. 9 illustrates exemplary implementation of transmission and reception functions of an FDD RN.

Referring to FIG. 9, during a reception operation, a downlink signal received from an eNB is subjected to an OFDM baseband reception process 913 after being processed in a duplexer 911 and a Fast Fourier Transform (FFT) module 912. An uplink signal received from a UE is subjected to a Discrete Fourier Transform-spread-OFDMA (DFT-s-OFDMA) baseband reception process 923 after being processed in a duplexer 921 and an FFT module 922. The reception process for a downlink signal received from the eNB may be simultaneously performed in parallel with the reception process for an uplink signal received from the UE.

During a transmission operation, an uplink signal to be transmitted to the eNB is subjected to a DFT-s-OFDM baseband transmission process 933 and then transmitted through an Inverse Fast Fourier Transform (IFFT) module 932 and a duplexer 931. A downlink signal to be transmitted to the UE is subjected to an OFDMA baseband reception process 943 and then transmitted through an IFFT module 942 and a duplexer 941. The transmission process for an uplink signal to be transmitted to the eNB may be simultaneously performed in parallel with the transmission process for a downlink signal to be transmitted to the UE. One-directional duplexers illustrated in FIG. 9 may be configured into a single bi-directional duplexer. For instance, the duplexers 911 and 931 may be incorporated into a single bi-directional duplexer and the duplexers 921 and 941 may be incorporated into a single bi-directional duplexer. A bi-directional duplexer may be configured such that an IFFT module (or an FFT module) and a baseband process module associated with transmission and reception in a specific carrier frequency band are branched from the bi-directional duplexer.

With respect to the RN's usage of a frequency band (or spectrum), its operation can be classified into in-band and out-band. For an in-band RN, a backhaul link shares the same frequency band with an access link. If the backhaul link and the access link operate in different frequency bands, the RN is an out-band RN. In both in-band and out-band relaying, a UE operating in the conventional LTE system such as one conforming to Release-8 should be able to access a donor cell.

Depending on whether a UE is aware of the existence of an RN, RNs may be classified into a transparent RN and a non-transparent RN. If the UE does not perceive whether it communicates with a network via an RN, the RN is a transparent RN. In contrast, if the UE perceives whether it communicates with a network via an RN, the RN is a non-transparent RN.

In relation to control of RNs, RNs may be classified into an RN configured as a part of a donor cell and an RN that self-controls a cell.

The former RN may have an RN ID, although it does not have its own cell ID. If at least a part of Radio Resource Management (RRM) of an RN is controlled by an eNB covering the donor cell, the RN is regarded as configured as a part of the donor cell, even though the other parts of the RRM reside in the RN. Preferably, this RN can support legacy UEs. For instance, smart repeaters, decode-and-forward relays, Layer 2 (L2) relays, and Type-2 relays form a part of a donor cell.

The latter RN controls one or more cells. The cells are allocated their unique physical cell IDs and they may use the same RRM mechanism. From the viewpoint of a UE, there is no distinction between accessing a cell controlled by an RN and accessing a cell controlled by a macro eNB. Preferably, a cell controlled by this type of RN may support legacy UEs. For example, RNs of this type include self-backhauling RNs, Layer 3 (L3) relays, Type-1 relays, and Type-1a relays.

A Type-1 relay is an in-band RN that controls a plurality of cells. Each of the plurality of cells appears to a UE as a separate cell distinct from a donor cell. The plurality of cells have their own physical cell IDs (as defined in LTE Release-8) and the RN can transmit its own synchronization channels, RSs, etc. During a single-cell operation, a UE may receive scheduling information and an HARQ feedback directly from the RN and transmit its control channels (a Scheduling Request (SR), a CQI, an ACK/NACK, etc.) to the RN. The Type-1 relay appears as a legacy eNB (operating in conformance to LTE Release-8) to a legacy UE (conforming to LTE Release-8). That is, the Type-1 relay has backward compatibility. On the other hand, to LTE-A UEs, the Type-1 relay appears differently from a legacy eNB. Thus the Type-1 relay can enhance performance.

Except for its out-band operation, a Type-1a relay is characterized by the same set of features as the Type-1 relay. The Type-1a relay may be configured such that the influence of its operation on an L1 operation is minimized or eliminated.

A Type-2 relay is an in-band RN that does not have its own physical cell ID and thus does not form a new cell. Since the Type-2 relay is transparent to legacy UEs, the legacy UEs do not notice the existence of the type-2 relay. The Type-2 relay can transmit a PDCCH but does not transmit at least a CRS and a PDCCH.

In order to allow in-band relaying, some resources in the time-frequency space should be set aside for a backhaul link and these resources may be set not to be used for an access link. This is called resource partitioning.

A description will be given of the general principle of resource partitioning at an RN. A backhaul downlink and an access downlink may be TDM-multiplexed in one carrier frequency. That is, only one of the backhaul downlink and the access downlink is active at any time. Similarly, a backhaul uplink and an access uplink may be TDM-multiplexed in one carrier frequency. That is, only one of the backhaul uplink and the access uplink is active at any time.

Multiplexing of backhaul links in FDD is performed such that backhaul downlink transmission and backhaul uplink transmission take place in a downlink frequency band and an uplink frequency band, respectively. In comparison, multiplexing of backhaul links in TDD is performed such that backhaul downlink transmission and backhaul uplink transmission take place in a downlink subframe band between an eNB and an RN and an uplink subframe between the eNB and the RN, respectively.

In case of an in-band RN, for example, if backhaul downlink reception from an eNB and access downlink transmission to a UE are performed simultaneously in the same frequency band, a signal transmitted from the transmitter of the RN may be received at the receiver of the RN. As a result, signal interference or Radio Frequency (RF) jamming may occur at the RF front-end of the RN. Likewise, if access uplink reception from a UE and backhaul uplink transmission to an eNB take place simultaneously in the same frequency band, the RF front-end of the RN may experience signal interference. Therefore, simultaneous eNB-to-RN and RN-to-UE transmissions in the same frequency band may not be feasible unless a reception signal and a transmission signal are sufficiently isolated from each other, for example, a Tx antenna is geographically apart enough from an Rx antenna (e.g. on the ground/underground).

One way to handle the signal interference is to operate the RN such that while the RN is receiving a signal from a donor cell, it is not transmitting signals to UEs. That is, a gap is created in the RN-to-UE transmission and UEs (including legacy UEs) are not supposed to expect any RN transmission during the gap. This gap may be created by configuring a Multicast Broadcast Single Frequency Network (MBSFN) subframe (see FIG. 10).

Figure 10:
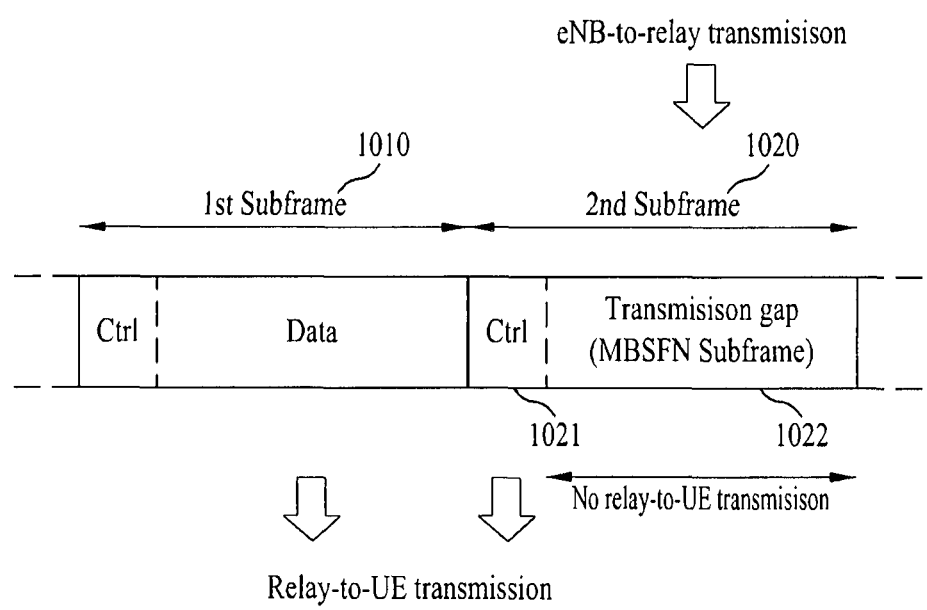
FIG. 10 illustrates exemplary partitioning of RN resources.

Referring to FIG. 10, a first subframe 1010 is a general subframe carrying a downlink (i.e. an access downlink) control signal and data from an RN to a UE, and a second subframe 1020 is an MBSFN subframe that carries a control signal from the RN to the UE in a control region 1021 but does not carry a signal from the RN to the UE in the remaining region 1022 of the MBSFN subframe. Since a legacy UE expects reception of a PDCCH in every downlink subframe, that is, the RN needs to support legacy UEs' reception of a PDCCH and measurement using the PDCCH within its coverage, a PDCCH needs to be transmitted in every downlink subframe, for reliable operation of the legacy UEs. Accordingly, the RN needs to perform access downlink transmission, instead of backhaul downlink reception, even in the first N (N=1, 2 or 3) OFDM symbols of a subframe set for downlink transmission (i.e. backhaul downlink transmission) from the eNB to the RN, that is, in the second subframe 1020. In this context, a PDCCH is transmitted from the RN to a UE in the control region 1021 of the second subframe 1020, thereby providing backward compatibility to legacy UEs served by the RN. While no RN-to-UE transmission takes place in the remaining region 1022 of the second subframe 1020, the RN can receive a signal from the eNB in the remaining region 1022. This frequency partitioning prevents simultaneous access downlink transmission and backhaul downlink reception at an in-band RN.

The second subframe 1020 being an MBSFN subframe will be detailed below. The control region 1021 of the second subframe 1020 may be referred to as a relay non-hearing period. During the relay non-hearing period, the RN transmits an access downlink signal without receiving a backhaul downlink signal. As stated before, the relay non-hearing period may be set to be 1, 2 or 3 OFDM symbols long. The RN may perform access downlink transmission to a UE during the relay non-hearing period 1021 and perform backhaul downlink reception from the eNB in the remaining region 1022. Because the RN is not allowed to perform simultaneous transmission and reception in the same frequency band, the RN takes a certain time to transition from a Tx mode to an Rx mode. Therefore, it is necessary to set a Guard Time (GT) in which the RN can switch from the Tx mode to the Rx mode in a first some period of the backhaul downlink reception region 1022. When the RN performs backhaul downlink reception from the eNB and access downlink transmission to a UE, a GT may also be set for switching from the Rx mode to the Tx mode of the RN. The length of the GT may be given as a time-domain value, for example, $k$ ($k \geq 1$) time samples (Ts) or one or more OFDM symbols. If successive backhaul downlink subframes are configured for the RN according to a specific subframe timing alignment relationship, a GT may not be defined or set in the last part of a subframe. To maintain backward compatibility, the GT may be defined only in a frequency area set for backhaul downlink subframe transmission. If a GT is set in an access downlink period, legacy UEs may not be supported. The RN may receive a PDCCH and a PDSCH from the eNB in the backhaul downlink reception period 1022 except for the GT. The PDCCH and PDSCH may be referred to as a Relay-PDCCH (R-PDCCH) and a Relay-PDSCH (R-PDSCH) in the sense that they are physical channels dedicated to an RN).

Multi-Carrier Technology

Although downlink and uplink bandwidths are different, a wireless communication system typically uses one carrier. For example, a wireless communication system having one carrier for each of the downlink and the uplink and symmetry between the downlink and uplink bandwidths may be provided based on a single carrier.

The International Telecommunication Union (ITU) requests that IMT-Advanced candidates support wider bandwidths, compared to legacy wireless communication systems. However, allocation of a wide frequency bandwidth is not easy in the world except for some regions. Accordingly, a technology for efficiently using small segmented bands, known as carrier aggregation (bandwidth aggregation) or spectrum aggregation, has been developed in order to aggregate a plurality of physical bands to a logical wider band.

Carrier aggregation was introduced to support increased throughput, prevent a cost increase caused by introduction of wideband RF devices, and ensure compatibility with legacy systems. Carrier aggregation enables data exchange between a UE and an eNB through a group of carriers each having a bandwidth unit defined in a legacy wireless communication system (e.g. 3GPP LTE Release-8 or Release-9 in case of 3GPP LTE-A). The carriers each having a bandwidth unit defined in the legacy wireless communication system may be called Component Carriers (CCs). Carrier aggregation using one or more CCs may apply to each of the downlink and the uplink. Carrier aggregation may support a system bandwidth of up to 100 MHz by aggregating up to five CCs each having a bandwidth of 5, 10 or 20 MHz.

A downlink CC and an uplink CC may be represented as a DL CC and a UL CC, respectively. A carrier or CC may be represented as a cell in terms of function configuration in the 3GPP LTE system. Thus a DL CC and a UL CC may be referred to as a DL cell and a UL cell, respectively. Hereinbelow, the term 'carriers', 'component carriers', 'CCs' or "cells" will be used to signify a plurality of carriers to which carrier aggregation is applied.

Downlink carrier aggregation may be described as an eNB's supporting downlink transmission to a UE in frequency resources (subcarriers or PRBs) of one or more carrier bands in time resources (allocated in units of a subframe). Uplink carrier aggregation may be described as a UE's supporting uplink transmission to an eNB in frequency resources (subcarriers or PRBs) of one or more carrier bands in time resources (allocated in units of a subframe).

While DL/UL CC setup has been described, centering on the relationship between an eNB and a UE, to which the present invention is not limited, an RN may operate on multiple carriers, for example. That is, one or more carriers may be aggregated for a backhaul link and an access link.

RLF-Related Operation

An RLF may occur between an eNB and a UE. The RLF means a state in which the quality of a radio link between the eNB and the UE is degraded and thus signal transmission and reception is difficult between them. A description will be given below of a procedure for detecting an RLF and searching for a new radio link.

In the 3GPP LTE system, Radio Resource Control (RRC) state between an eNB and a UE is divided into RRC_CONNECTED state and RRC_IDLE state. In the RRC_CONNECTED state, an RRC connection has been established between the eNB and the UE and thus the UE can transmit data to and receive data from the eNB. When the RRC connection is released between the UE and the eNB, this state is called the RRC_IDLE state.

An RLF-related operation involves (1) detection of a physical layer problem in the RRC_CONNECTED state, (2) recovery from the physical layer problem, and (3) RLF detection.

(1) Upon receipt of as many consecutive "out-of-sync" indications as a predetermined value N310 from a lower layer, the UE activates a T310 timer. The lower layer (i.e. the physical layer) may provide an "out-of-sync" indication to a higher layer, when demodulation of a received PDCCH is impossible or the Signal-to-Interference plus Noise Ratio (SINR) of the PDCCH is low. N310 and T310 are higher-layer parameters that may be preset.

(2) Upon receipt of as many consecutive "in-sync" indications as a predetermined value N311 while the T310 timer is running, the UE stops the T310 timer. N311 is a higher-layer parameter that may be predefined.

(3) Upon expiration of the T310 timer, the UE starts a connection re-establishment procedure, determining that an RLF has been detected. The expiration of the T310 timer implies that the T310 timer has reached a predetermined time T310 without stopping in the middle. In the connection re-establishment procedure, the UE transmits an RRC connection re-establishment request to the eNB, receives an RRC connection re-establishment message from the eNB, and then transmits an RRC connection re-establishment completion message to the eNB. For details of the RLF-related operation, section 5.3.11 of the 3GPP standard document, TS36.331 may be referred to.

As stated before, the RLF process is a process of searching for a new link, when the link state between a transmitter and a receiver keeps degraded during activating an internal timer. Because it is difficult to predict the state of the link (Uu link) between the eNB and the UE in the 3GPP LTE system, it is determined whether an RLF has been detected using parameters such as N310, N311 and T310.

The 3GPP LTE-A system may introduce an RN for forwarding information and/or data between an eNB and a UE. If the quality of a backhaul link (Un link) between an eNB (donor-BS) and an RN is degraded despite a good quality of an access link (Uu link) between the RN and a UE, the RN may not forward information and/or data to the UE via the access link. Since the quality of the backhaul link is degraded but the access link is in a normal state, the afore-described RLF process between the UE and the eNB may not be still applied to the UE (R-UE) served by the RN. In other words, physical layer/higher layer signaling and procedures defined to solve the problem of the degradation of link quality between an eNB and a UE, such as handover, release, and an RLF process, in a legacy wireless communication system without RNs are applicable as a solution only to the degradation of the access link between the RN and the R-UE. However, when the backhaul link between the RN and the donor-eNB is degraded, the conventional physical layer/higher layer signaling and procedures are not still applicable between the RN and the R-UE. Accordingly, there exists a need for defining a new operation for an access link, when the quality of a backhaul link is degraded.

The present invention provides access link (Uu link) interface signaling and procedures, taking into account the state of a backhaul link (a Un link) in a wireless communication system using RNs. To be more specific, when the quality of a backhaul link between a donor-eNB and an RN is degraded, new signaling other than a conventional handover or RLF procedure is proposed for the purpose of active operations of R-UEs connected to the RN and an associated operation is defined for the RN. When the backhaul link quality is degraded, operations may be configured for the RN according to the following embodiments of the present invention.

Embodiment 1

Figure 11:
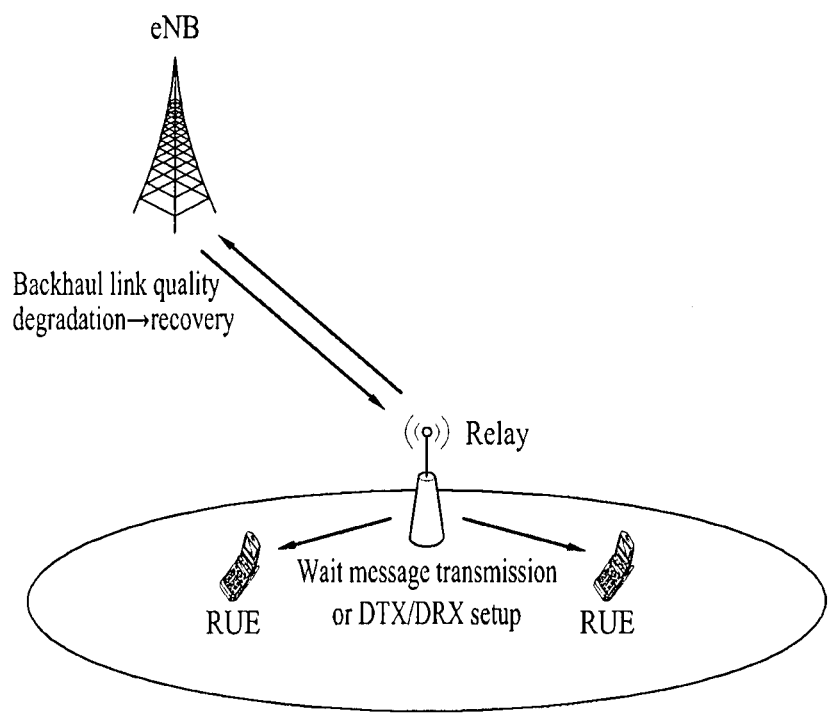
FIG. 11 illustrates an operation of an RN according to an embodiment of the present invention.

According to Embodiment 1, an access link wait mode is defined. When the quality of a backhaul link is degraded, for example, when an RLF occurs, an access link may be placed in the access link wait mode during RLF recovery for the backhaul link, as a method for managing the access link. FIG. 11 illustrates an operation of an RN according to Embodiment 1.

Referring to FIG. 11, to indicate waiting of access links to R-UEs, an RN may transmit an access link wait message to the R-UEs or set up Discontinuous Transmission (DTX)/Discontinuous Reception (DRX). The RN may signal the access link wait message cell-specifically or UE-specifically on a PDCCH for each R-UE, or may broadcast the access link wait message in an SIB to the R-UEs within the coverage of the RN. The DTX/DRX setup may be performed by a higher-layer signaling and operation.

The access link wait message may be signaled or the DTX/DRX may be set up, when the RN does not have further control information and data to be transmitted to the R-UEs at the moment when a backhaul link RLF occurs, that is, after the RN transmits only control information and data buffered in a buffer designated for access downlink transmission. Thus the R-UEs may wait until the backhaul link is recovered, for example, through handover of the RN to another eNB.

Setting the access link wait mode is the simplest solution to the degradation of backhaul link quality. However, if the backhaul link recovery is delayed or impossible, the access links may be kept in the wait mode. To avert this problem, if the backhaul link is not recovered for a predetermined time or longer, the RN may indicate discontinuation of access link transmission to the R-UEs. For this purpose, the RN may determine whether the backhaul link has been recovered using a predetermined timer and, upon expiration of the timer, the RN may transmit a release message to the R-UEs. A conventional timer may be reused or a new timer may be defined, for the timer. Or a timer for indicating disconnection of access links (Uu links) to the R-UEs a predetermined time later may be defined. Upon receipt of the release message or information indicating the time of disconnecting the access links, the R-UEs may re-start cell selection, etc. in IDLE mode. The release message may be signaled to the R-UEs cell-specifically or UE-specifically on a PDCCH for each R-UE, or may be broadcast in an SIB to the R-UEs within the coverage of the RN.

Embodiment 2

Embodiment 2 provides a method for performing backhaul link handover (or backhaul link re-establishment) when the quality of a backhaul link is degraded. The backhaul link handover refers to a process in which an RN searches for a new target cell and performs handover for a backhaul link to the target cell, while maintaining an access link. The target cell may be an eNB other than a serving eNB or another carrier (cell) within a serving cell.

Figure 12:
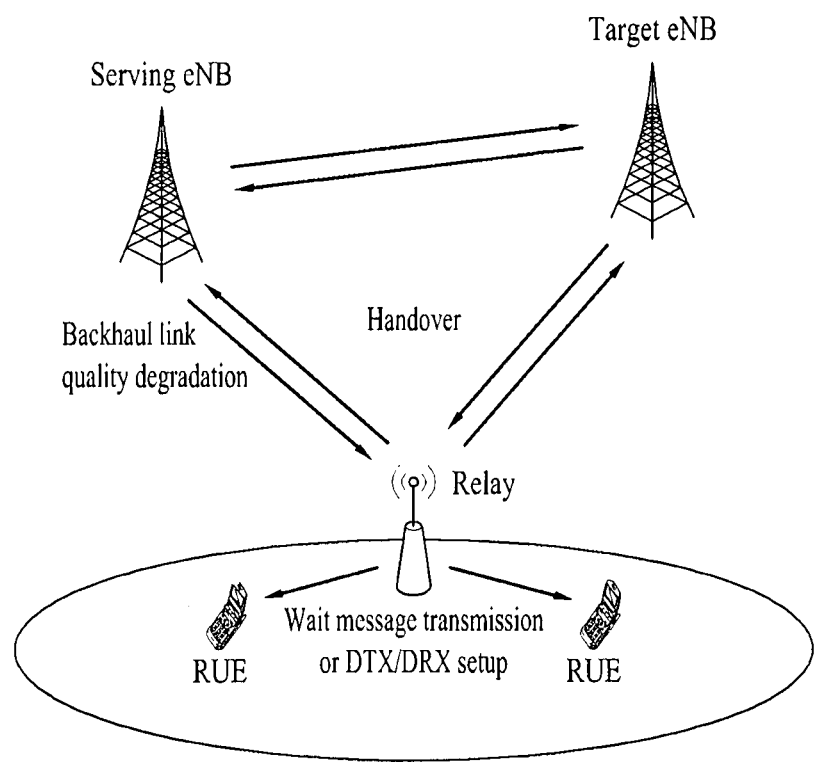
FIG. 12 illustrates an operation of an RN according to another embodiment of the present invention.

During the backhaul link handover, the RN may perform conventional 3GPP LTE handover (that is, conventional handover defined between an eNB and a UE is applied between an eNB and an RN), while R-UEs wait until a next transmission on access links without any signaling or are placed in the wait mode described in Embodiment 1 through signaling. FIG. 12 illustrates an operation of an RN according to Embodiment 2.

When the quality of the backhaul link is degraded, the RN may perform a connection re-establishment procedure within the donor-eNB that serves the RN. In this case, the access links may be placed in the wait mode, while the backhaul link connection re-establishment is performed.

Similarly to Embodiment 1, if the backhaul link handover is failed or the connection re-establishment procedure that the RN performs with respect to the eNB is failed within a predetermined time, the RN may indicate discontinuation of access link transmission to the R-UEs. That is, as a solution to the handover failure or connection re-establishment failure, the RN may transmit a release message to the R-UEs or may indicate disconnection of the access links to the R-UEs using a predetermined timer, so that the R-UEs may perform cell selection, etc.

Embodiment 3

Figure 13:
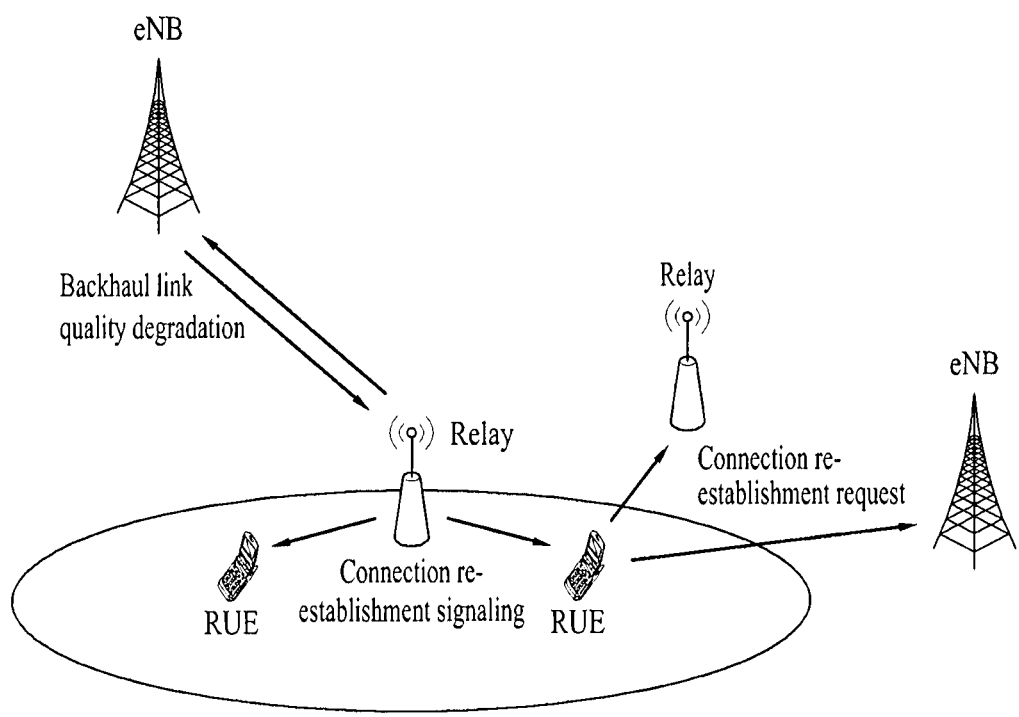
FIG. 13 illustrates an operation of an RN according to a further embodiment of the present invention.

Embodiment 3 provides a method for commanding an R-UE to perform connection re-establishment by an RN, when the quality of a backhaul link is degraded. FIG. 13 illustrates an operation of an RN according to Embodiment 3.

When a UE detects an RLF on a radio link between the UE and an eNB, the conventional 3GPP LTE standard regulates that the UE performs a connection re-establishment procedure. The connection re-establishment procedure is performed by transmitting a connection re-establishment request message to a target cell without signaling from a serving cell by the UE that has detected an RLF on the link between the UE and the serving cell.

If the conventional connection re-establishment procedure is still used, an R-UE does not perform a connection re-establishment procedure as far as an access link between the R-UE and an RN is normal, even though the quality of a backhaul link is degraded. Accordingly, when the quality of the backhaul link is degraded, the RN commands the R-UE to perform a connection re-establishment procedure by signaling, thereby solving problems of the access link caused by the backhaul link quality degradation.

Since this connection re-establishment procedure is performed while the RRC_CONNECTED mode is maintained, it is efficient in that the R-UE does not perform an operation for cell selection.

The connection re-establishment command may be signaled from the RN to the R-UE, periodically or in an even-triggered manner. In the latter case, the RN may transmit the connection re-establishment command, upon receipt of a predetermined number of 'out-of-sync' messages, or using a T301 timer, for example. In this manner, the RN may signal the connection re-establishment command to the R-UE even before an RLF occurs to the backhaul link.

In the case where the RN signals the connection re-establishment command to the R-UE, a cell to which a connection is to be re-established should be determined. This cell may be another eNB or another RN that can serve the R-UE. Or, when the RN supports a plurality of cells, the R-UE may perform the connection re-establishment procedure to a cell other than the serving cell.

A cell to which a connection re-establishment request message is to be transmitted is known explicitly or implicitly to the R-UE that has received the connection re-establishment command from the RN. For instance, the RN may indicate the cell to which the connection re-establishment request message is to be transmitted, using an explicit parameter, simultaneously with transmitting the connection re-establishment command to the R-UE. The RN may signal the connection re-establishment command cell-specifically or UE-specifically on a PDCCH for each R-UE, or broadcast the connection re-establishment command in an SIB to the R-UEs within the coverage of the RN.

Similarly to Embodiment 1, if the R-UE fails in the connection re-establishment procedure within a predetermined time, the RN may indicate discontinuation of access link transmission to the R-UE. That is, as a solution to a handover failure or a connection re-establishment failure, the RN may transmit a release message to the R-UE or indicate disconnection of the access link to the R-UE using a predetermined timer, so that the R-UE may perform cell selection, etc.

The methods described in Embodiment 1, Embodiment 2 and Embodiment 3 may be performed individually or in combination of one or more methods.

Figure 14:
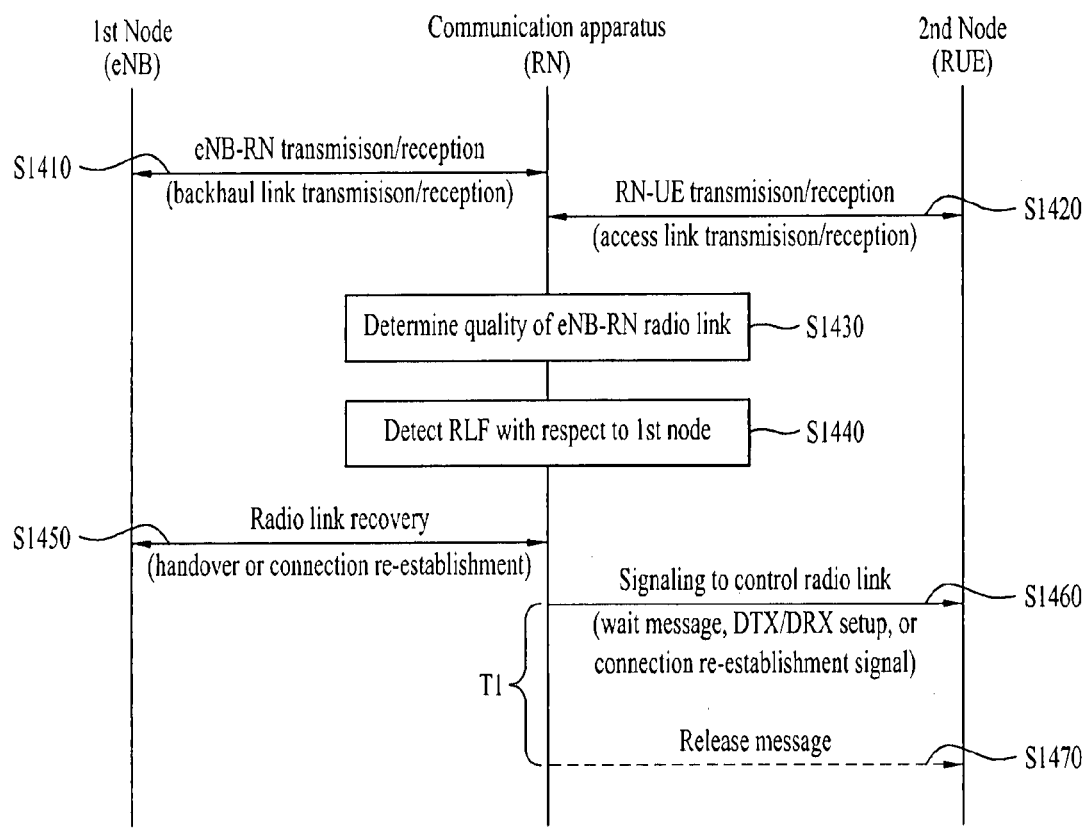
FIG. 14 is a diagram illustrating a signal flow for a method for processing the degradation of radio link quality according to an embodiment of the present invention.

FIG. 14 is a diagram illustrating a signal flow for a method for processing the degradation of radio link quality according to an embodiment of the present invention. The following description is given of an operation of a transmission and reception apparatus connected wirelessly to a first node and a second node. The transmission and reception apparatus is an RN, the first node is a donor-eNB, and the second node is an R-UE served by the RN, by way of example.

Referring to FIG. 14, the RN transmits a signal to and receives a signal from the eNB on a radio link (S1410). The transmission and reception may be referred to as eNB-RN transmission and reception or backhaul link transmission and reception. The RN transmits a signal to and receives a signal from the R-UE on a radio link (S1420). The transmission and reception may be referred to as RN-UE transmission and reception or access link transmission and reception. The eNB-RN transmission and reception and the RN-UE transmission and reception may be time-multiplexed in steps S1410 and 1420.

The RN may determine the quality of the radio link between the RN and the eNB (S1430). For example, the RN may determine whether the quality of the eNB-RN radio link has dropped to or below a predetermined threshold by performing the afore-described RLF-related operation. The RN may detect an RLF with respect to the eNB (S1440).

The RN may recover the eNB-RN radio link (i.e. the backhaul link between eNB and the RN) (S1450). The radio link recovery may involve, for example, handover to a new target cell or a connection re-establishment procedure as stated before.

If the quality of the radio link between the RN and the eNB is degraded, the RN may transmit a radio link control message for controlling transmission and reception on the access link to the R-UE (S1460). The radio link control message may be a wait message, a message indicating DTX/DRX setup, or a message commanding transmission of a connection re-establishment request to a target cell. Step S1460 may be performed simultaneously with step S1450, or before or after step S1450.

When transmitting the radio link control message to the R-UE, the RN may activate a timer set to a predetermined timer value T1 in step S1460. If the radio link between the RN and the eNB is not recovered until expiration of the timer, the RN may transmit a release message to the R-UE (S1470). Thus the R-UE may perform a procedure such as cell selection.

The radio link control message of step S1460 and/or the release message of step S1470 may be transmitted as cell-specific control signaling, UE-specific control signaling, or a broadcast message.

The description of the foregoing embodiments of the present invention is applicable to the method for handling the degradation of the quality of a radio link described in relation to FIG. 14. Redundant matters are omitted for clarity.

Figure 15:
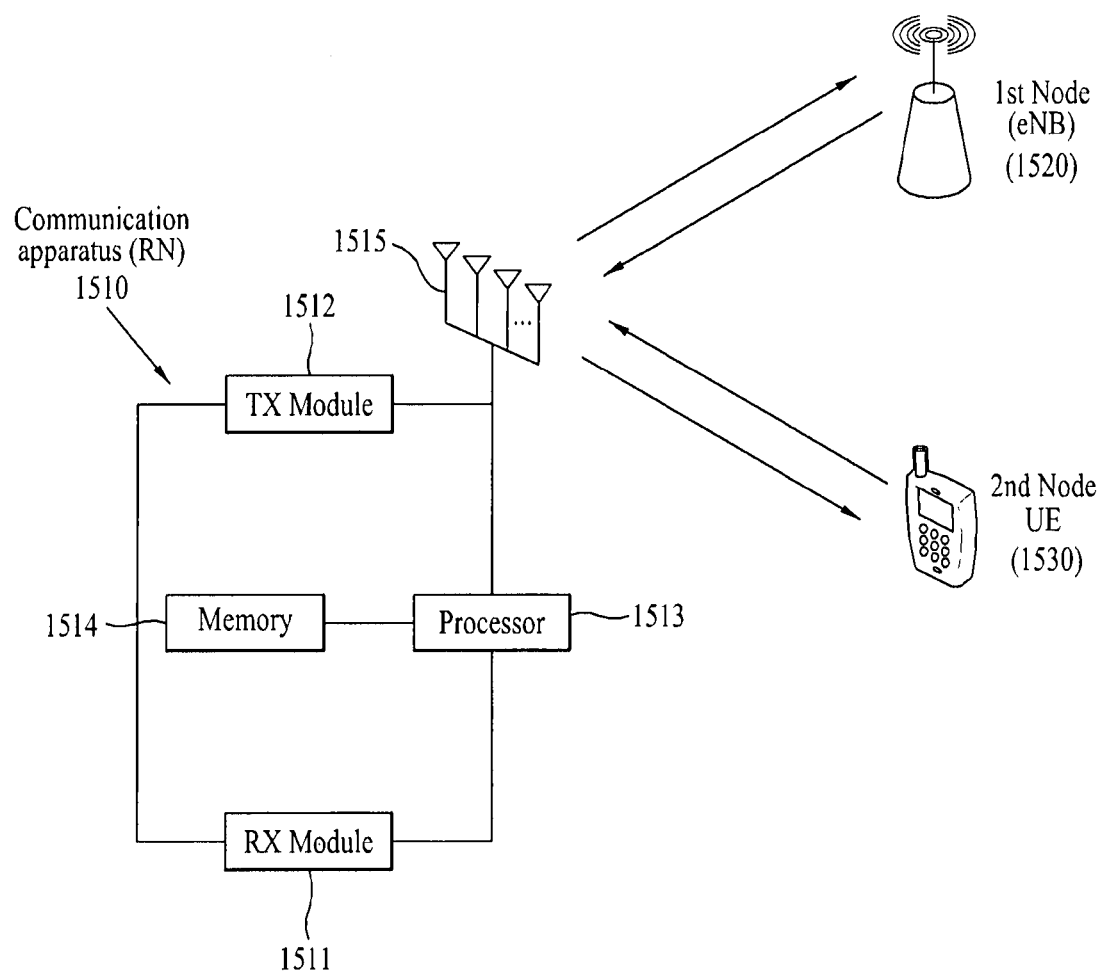
FIG. 15 is a block diagram of a transmission and reception apparatus according to an embodiment of the present invention.

FIG. 15 is a block diagram of a transmission and reception apparatus according to an embodiment of the present invention.

Referring to FIG. 15, a transmission and reception apparatus 1510 may be connected wirelessly to a first node 1520 and a second node 1530. The transmission and reception apparatus 1510 may be an RN, the first node 1520 may be a donor-eNB, and the second node 1530 may be an R-UE served by the RN 1510. With reference to FIG. 15, the configuration of the transmission and reception apparatus 1510 will be described in detail.

The transmission and reception apparatus 1510 may transmit and receive control information and/or data to and from the first node 1520 via a radio link (i.e. an eNB-RN link or a backhaul link). The transmission and reception apparatus 1510 may also transmit and receive control information and/or data to and from the second node 1530 via a radio link (i.e. an RN-UE access link).

The transmission and reception apparatus 1510 may include an Rx module 1511, a Tx module 1512, a processor 1513, a memory 1514, and a plurality of antennas 1515. The plurality of antennas 1515 are transceivers supporting MIMO.

The Rx module 1511 may include a first Rx module (not shown) for receiving signals, data, and information on a downlink from the first node 1520 and a second Rx module (not shown) for receiving signals, data, and information on an uplink from the second node 1530. The Tx module 1512 may include a first Tx module (not shown) for transmitting signals, data, and information on an uplink to the first node 1520 and a second Tx module (not shown) for transmitting signals, data, and information on a downlink to the second node 1530. The first Rx and Tx modules may be configured into a single physical layer entity and the second Rx and Tx modules may be configured into another single physical layer entity.

The processor 1513 may provide overall control to the transmission and reception apparatus 1510. Especially, the processor 1513 may control transmission and reception of signals, data, and information through the Rx module 1511 and the Tx module 1512.

In accordance with an embodiment of the present invention, the processor 1513 of the transmission and reception apparatus 1510 may be adapted to determine the quality of the radio link between the first node 1520 and the transmission and reception apparatus 1510. For instance, the processor 1513 may determine whether the quality of the radio link established with the first node 1510 is at or below a predetermined threshold and detect an RLF by performing an RLF-related operation. If the quality of the radio link established with the first node 1510 is at or below the predetermined threshold, the processor 1513 may recover the radio link. For example, the processor 1513 may perform handover to a new target cell or a connection re-establishment procedure. In addition, if the quality of the radio link established with the first node 1510 is at or below the predetermined threshold, the processor 1513 may transmit a radio link control signal to the second node 1530 to control transmission and reception to and from the second node 1530 on the radio link between the second node 1530 and the transmission and reception apparatus 1510. For example, the processor 1513 may transmit a wait message, a message indicating DTX/DRX setup, a message commanding transmission of a connection re-establishment request to a target cell as the radio link control message.

When transmitting the radio link control message to the second node 1530, the processor 1513 may activate a timer set to a predetermined timer value T1. If the radio link between the transmission and reception apparatus 1510 and the first node 1520 has not been recovered successfully until expiration of the timer, the processor 1513 may transmit a release message to the second node 1530.

The afore-described embodiments of the present invention may be applied to the configuration of the transmission and reception apparatus 1510. Redundant matters are omitted for clarity. That is, details related to the operations of an RN described herein may be implemented in the components of the transmission and reception apparatus 1510.

Besides, the processor 1513 processes received information and information to be transmitted externally. The memory 1514 may store processed information for a predetermined time period. The memory 1514 may be replaced with a component such as a buffer (not shown).

The embodiments of the present invention may be achieved by various means, for example, hardware, firmware, software, or a combination thereof.

In a hardware configuration, methods according to embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing functions or operations as set forth herein. Software code may be stored in a memory unit and executed by a processor. The memory unit is located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. For example, an embodiment of the present invention may be constructed by combining components or configurations of the above-described embodiments of the present invention. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. In addition, it will be obvious to those skilled in the art that claims that do not explicitly cite in each other in the appended claims may be presented in combination as an exemplary embodiment of the present invention or included as a new claim by subsequent amendment after the application is filed.

INDUSTRIAL APPLICABILITY

The above-described embodiments of the present invention are applicable to a variety of mobile communication systems.

The invention claimed is:

1. A method for processing degradation of radio link quality in a Relay Node (RN) connected wirelessly to a Base Station (BS) and a User Equipment (UE), the method comprising:

determining, at the RN, quality of a radio link between the BS and the RN;

recovering, at the RN, the radio link between the BS and the RN, when the quality of the radio link between the BS and the RN is decreased to or below a predetermined threshold; and transmitting, at the RN, to the UE a signaling to control communication on a radio link between the UE and the RN, when the quality of the radio link between the BS and the RN is decreased to or below the predetermined threshold.

2. The method according to claim 1, wherein when the quality of the radio link between the BS and the RN is decreased to or below the predetermined threshold, a Radio Link Failure (RLF) of the radio link between the BS and the RN is detected.

3. The method according to claim 1, wherein the signaling to control communication on the radio link between the UE and the RN is a wait message for transmission and reception to and from the UE, a message configuring Discontinuous Transmission/Discontinuous Reception (DTX/DRX) for the UE, or a message commanding the UE to transmit a connection re-establishment request message to a target cell.

4. The method according to claim 1, wherein the signaling to control communication on the radio link between the UE and the RN is a cell-specific control signaling, a UE-specific control signaling, or a broadcast message.

5. The method according to claim 1, wherein the recovery of the radio link between the BS and the RN comprises performing handover to a target cell or performing a connection re-establishment procedure.

6. The method according to claim 1, further comprising transmitting a release message to the UE, when the radio link between the BS and the RN is not recovered in a predetermined time period.

7. The method according to claim 6, wherein the release message is a cell-specific control signaling, a UE-specific control signaling, or a broadcast message.

8. A Relay Node (RN) for processing degradation of radio link quality, the RN comprising:
a first reception module for receiving a downlink signal from a Base Station (BS);
a first transmission module for transmitting an uplink signal to the BS;
a second reception module for receiving an uplink signal from a User Equipment (UE);
a second transmission module for transmitting a downlink signal to the UE; and
a processor for controlling the RN including the first and second reception modules and the first and second transmission modules,
wherein the processor is configured to:
determine quality of a radio link between the BS and the RN;
recover the radio link between the BS and the RN, when the quality of the radio link between the BS and the RN is decreased to or below a predetermined threshold, and
transmit to the UE through the second transmission module a signaling to control communication on a radio link between the UE and the RN, when the quality of the radio link between the BS and the RN is decreased to or below the predetermined threshold.

9. The RN according to claim 8, wherein when the quality of the radio link between the BS and the RN is decreased to or below the predetermined threshold, a Radio Link Failure (RLF) of the radio link between the BS and the RN is detected.

10. The RN according to claim 8, wherein the signaling to control communication on the radio link between the UE and the RN is a wait message for communication to and from the UE, a message configuring Discontinuous Transmission/Discontinuous Reception (DTX/DRX) for the UE, or a message commanding the UE to transmit a connection re-establishment request message to a target cell.

11. The RN according to claim 8, wherein the signaling to control communication on the radio link between the UE and the RN is a cell-specific control signaling, a UE-specific control signaling, or a broadcast message.

12. The RN according to claim 8, wherein the processor recovers the radio link between the BS and the RN by performing handover to a target cell or performing a connection re-establishment procedure.

13. The RN according to claim 8, wherein when the radio link between the BS and the RN is not recovered in a predetermined time period, the processor is further configured to transmit a release message to the UE through the second transmission module.

14. The RN according to claim 13, wherein the release message is a cell-specific control signaling, a UE-specific control signaling, or a broadcast message.

* * * * *